March 21, 1961 A. C. SCHELL 2,976,493

PHASE STABLE AMPLIFIER

Filed Sept. 3, 1958 2 Sheets-Sheet 1

INVENTOR.
ALLAN C. SCHELL
BY Wade Koontz and Sherman H. Goldman
ATTORNEYS

March 21, 1961 A. C. SCHELL 2,976,493

PHASE STABLE AMPLIFIER

Filed Sept. 3, 1958 2 Sheets-Sheet 2

INVENTOR.
ALLAN C. SCHELL
BY Wade Koontz
and
Sherman H. Goldman
ATTORNEYS

United States Patent Office 2,976,493

Patented Mar. 21, 1961

2,976,493

PHASE STABLE AMPLIFIER

Allan C. Schell, Lexington, Mass., assignor to the United States of America as represented by the Secretary of the Air Force Filed Sept. 3, 1958, Ser. No. 758,868

2 Claims. (Cl. 330—107)

(Granted under Title 35, U.S. Code (1952), sec. 266)

The invention described herein may be manufactured and used by or for the United States Government for governmental purposes without payment to me of any royalty thereon.

This invention relates generally to amplifiers and more particularly to a high frequency phase stable amplifier system having a negligible phase difference between its input and output.

Prior art devices have utilized amplifiers having expensive, complicated tuned networks; however, since at high frequencies tube capacity is a function of the signal level, a fairly large phase difference is found to exist between the amplifier inputs and outputs. The device of my invention utilizes a system comprising an amplifier, which may have a provision for 180° phase change, in conjunction with a phase sensing device and a phase correcting device, which are capable of operation at high frequencies, thus resulting in a device with a negligible phase shift between the input and system output.

Accordingly, it is an object of my invention to produce a novel phase stable amplifier system.

It is another object of my invention to produce an amplifier system having inherent phase stability comprising an amplifier, a phase sensing device and a phase correcting device.

It is still another object of this invention to produce a novel phase stable amplifier which utilizes conventional, currently available components, is economical to construct, and lends itself to standard mass production techniques.

It is a further object of this invention to produce a phase stable amplifier capable of accurate control of phase at high operating frequencies.

It is a still further object of the invention to produce a novel phase shifter capable of creating a 180° phase shift to an input signal.

It is another object of this invention to produce a novel phase corrector.

These and other advantages, features and objects of the invention will become more apparent from the following description taken in connection with the illustrative embodiments in the accompanying drawings, wherein.

Figures 1, 2:
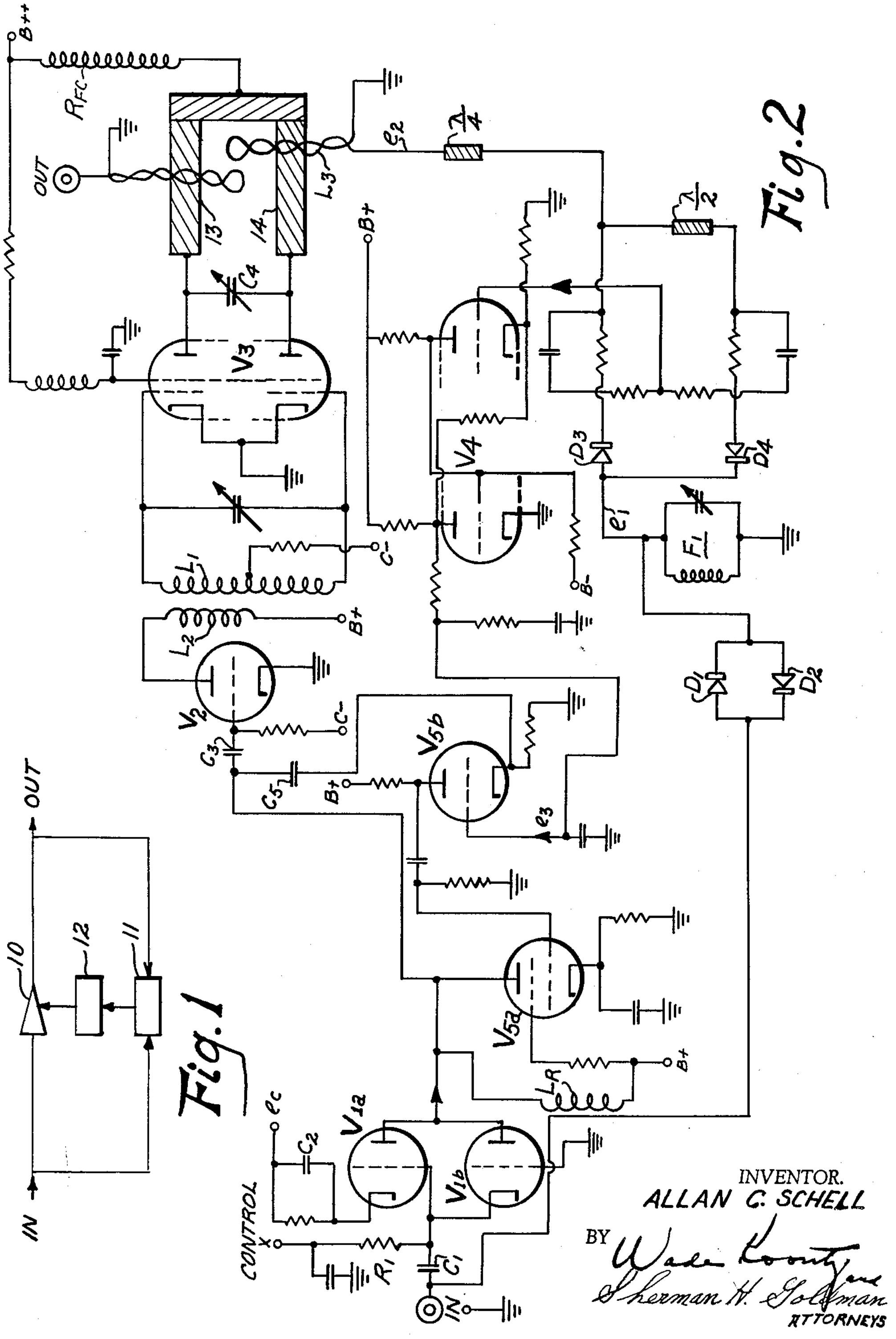
Figure 1 is a block diagram of the system of my invention.
Figure 2 is a schematic diagram of the system of Figure 1.

The system of my invention, as shown in Figure 1, utilizes an amplifier 10 and a feedback network comprising a phase sensing device 11 and a phase correcting device 12. The input and output signals are fed to the phase sensing device and compared. A difference in phase results in an error signal being applied to the phase corrector for adjustment of the amplifier.

Referring to Figure 2, the amplifier section receives a signal at the input through a coupling condenser $C_1$ to a dual triode $V_{1a}$—$V_{1b}$ which in this embodiment gives either a 0° or 180° phase shift to the incoming signal. A standard amplifier may be used in place of $V_1$; however, for use with the "Amplitude Scanning" system defined in application Serial No. 758,869, filed September 3, 1958, to Carlyle J. Sletten, a 0 or 180° phase shift is desirable. When the control point at X is connected with ground, the section B of $V_1$ conducts and the circuit behaves as a grounded grid amplifier giving no phase shift at the plate; however, a positive voltage at control point X sufficient to bias the section B of $V_1$ to cut off, equal to voltage $e_c$, would allow the section A to function as a grounded cathode amplifier. The fact that the output plates of both sections of the tube are tied together, as are the grid of $V_{1A}$ and the cathode of $V_{1B}$ which comprise the input, provides the same capacity to the phase correcting circuit to be described infra. The gains of $V_{1A}$ and $V_{1B}$ may be matched by changing cathode resistor $R_1$ and/or altering the capacity of bypass capacitor $C_2$. The output from $V_1$ is applied to the grid of tube $V_2$ which is a standard amplifier circuit with a tuned plate. The output of $V_2$, since the device is designed for high frequencies, is tripled by the resonant plate circuit and tube of the final stage $V_3$. A doubler or quadrupler circuit may be used; however, a tripler allows the 0–180° phase control to be placed at the input. An 832A tube is shown for $V_3$ although other tubes may be used depending on the frequency and power requirements. The grid coil $L_1$ of $V_3$ is wound through the plate coil $L_2$ of stage $V_2$ while the plate circuit consists of a pair of brass rods 13, 14 connected to the plates and shorted at approximately $\lambda/8$. A tuning capacitor $C_4$ across hte plate terminals of $V_3$ provides for a resonance adjustment.

The phase sensing device is null seeking since it must be insensitive to the phase dictated by the control of $V_1$. The phase sensing device is basically a sum and difference detector which receives the output signal by means of a pickup loop $L_3$ and the input signal by means of a tripler comprising diodes $D_1$ and $D_2$ and a filter network $F_1$ for removing unwanted harmonics. Assuming the voltage supplied by the pickup loop $L_3$ to be $e_2$ and the output from $D_1$ and $D_2$ to be $e_1$. Then the D.C. detected voltage across the diodes $D_3$ and $D_4$ of the phase sensing device will be $e_1+e_2$ and $e_1-e_2$. The voltage across diode $D_3$ will be positive while voltage across $D_4$ will be negative. The detected signals will be equal and opposite in sign and the output voltage from the phase sensor will be 0. This condition occurs when either $e_1$ or $e_2$ are zero or when $e_1$ is 90° out of phase with $e_2$. A half wave line provides 180° phase reversal for $e_2$. A $\lambda/4$ line is placed between the $V_3$ output and the phase sensing device in order that the $e_2$ voltage will be kept at either 0 or 180° in phase with respect to $e_1$. Thus a D.C. output signal appears at the grid of the right hand section of $V_4$ that is proportional to the phase difference and of the same sign is available for operating the phase corrector. For large excursions about zero phase difference the device is not linear, however, the phase corrector is designed such that stable nulls occur only at multiples of 360°.

A conventional D.C. amplifier at $V_4$ amplifies the signal from the phase sensing portion of the schematic and applies its output voltage $e_3$ to the correction device which in this case is a reactance tube $V_5$ capable of providing a phase shift in proportion to its input voltage $e_3$. $V_{5b}$ acts as a grounded grid amplifier for the signal from $V_1$ and acts as a conventional amplifier with respect to the control voltage $e_3$ and has its output applied to pentode section $V_{5A}$, the reactance tube portion of $V_5$. The control voltage $e_3$ and the output signal from $V_1$, which is shifted 90° out of phase by capacitor $C_5$, are applied to $V_{5b}$ with the control signal $e_3$ adapted to vary the amplification of $V_{5b}$.

The output of $V_{5b}$ is applied to the control grid of $V_{5a}$ and is out of phase with the plate voltage such that a change in reactance is seen at the input. $V_{5A}$ provides control of the resonant circuit of the amplifier $V_1$ which comprises $L_R$, the plate output capacitance of $V_1$ and the reactance tube $V_5$. Thus it can be seen that an error signal proportional to the phase difference between the input and output of an amplifier is used to control a reactance tube which adjusts the resonant circuit capacitance to hold the phase of an amplifier constant and independent of signal amplitude.

Figure 3:
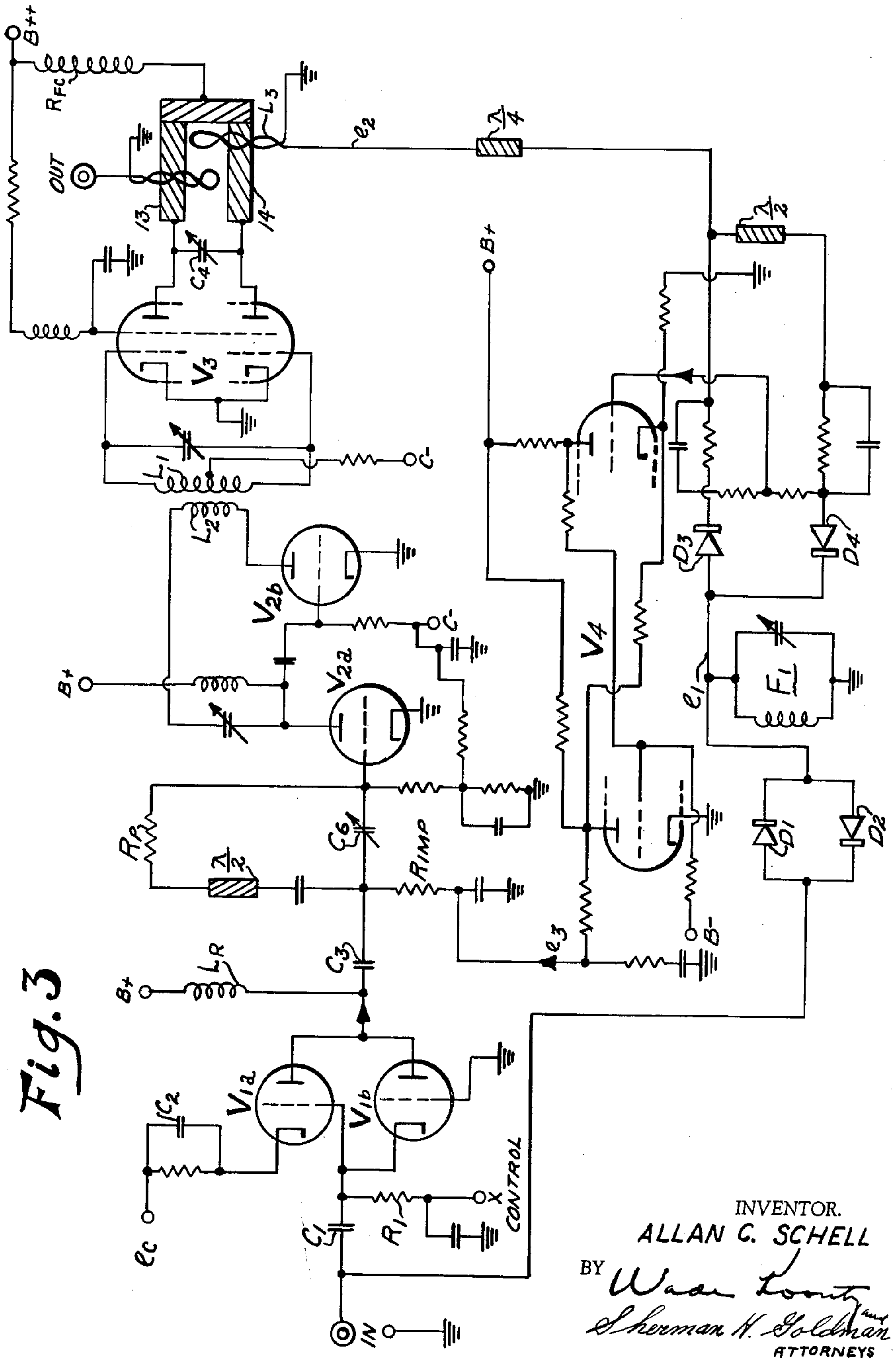
Figure 3 is a schematic diagram of an alternative embodiment of the system of Figure 1.

The alternative embodiment of Figure 3 is basically the same circuit as Figure 2, with the differences noted below. In the figures like characters designate like parts. In Figure 3, the output of $V_1$ is applied through an input capacitor $C_3$ to a phase shifter comprising $R_p$, $R_{imp}$ and a transformer section, which in this case is suitable for high frequencies and utilizes a section of $\lambda/2$ transmission line in conjunction with a voltage variable capacitor $C_6$ which may be a back biased silicon diode. The control voltage $e_3$ is applied to $C_6$ and changes its capacitance and thus changes the phase between the output voltage to amplifier unit $V_{2A}$, $V_{2B}$, $V_3$, and the input from $V_1$ without affecting the relative amplitude of the input and output voltage. $V_{2A}$ and $V_{2B}$ are substitute stages for $V_2$ of Figure 2 and are standard amplifiers with tuned plates to provide extra gain over that available in the embodiment of Figure 2.

Although the invention has been described with reference to particular embodiments, it will be understood to those skilled in the art that the invention is capable of a variety of alternative embodiments within the spirit and scope of the appended claims. For example, where $V_1$ is a standard amplifier without a means for phase shifting, the tripler portion of $V_2$ and $V_3$ and diodes $D_1$ and $D_2$ may be eliminated since the same frequency could appear throughout the device.

I claim:

1. In apparatus for stabilizing the phase of electronically amplified signals, the combination of a first amplifying means having signal input and output circuits, second and third amplifying means having inter-linked inductance coils providing a tunable input to said third amplifying means, said third amplifying means also including dual output electrodes forming with said inter-linked inductance coils a resonant couple, and a tuning capacitor bridging said electrodes, a signal pick-up coil adjacent said resonant couple, a pair of oppositely-poled diodes in parallel circuits connected to said pick-up coil and also to the signal input circuit of said first amplifying means, and means for applying to the signal output circuit of said first amplifying means a phase correction voltage whose amplitude is proportional to the algebraic difference, if any, between the output voltages of said oppositely-poled diodes.

2. Apparatus as defined in claim 1, wherein said correction voltage-applying means includes a reactance tube having a plate circuit connecting with the signal output circuit of said first amplifying means, a first grid circuit including a resonance-controlling inductance unit forming part of the signal output circuit of said first amplifying means, and a second grid circuit receiving the amplified algebraic difference output of said oppositely-poled diodes.

References Cited in the file of this patent

UNITED STATES PATENTS

| | | |
|---|---|---|
| 2,618,711 | Bourget | Nov. 18, 1952 |
| 2,714,136 | Greenwood | July 26, 1955 |
| 2,744,969 | Peterson | May 8, 1956 |
| 2,747,084 | Doelz | May 22, 1956 |
| 2,830,133 | Ranks | Apr. 8, 1958 |
| 2,866,018 | Bell | Dec. 23, 1958 |